(12) United States Patent
Baun et al.

(10) Patent No.: US 10,570,880 B2
(45) Date of Patent: Feb. 25, 2020

(54) CONTROL SYSTEM AND METHOD FOR WIND TURBINE HAVING MULTIPLE ROTORS

(71) Applicant: VESTAS WIND SYSTEMS A/S, Aarhus N (DK)

(72) Inventors: Torben Ladegaard Baun, Skødstrup (DK); Jesper Lykkegaard Neubauer, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 62 days.

(21) Appl. No.: 15/775,351

(22) PCT Filed: Nov. 17, 2016

(86) PCT No.: PCT/DK2016/050372
§ 371 (c)(1),
(2) Date: May 10, 2018

(87) PCT Pub. No.: WO2017/084674
PCT Pub. Date: May 26, 2017

(65) Prior Publication Data
US 2018/0355847 A1    Dec. 13, 2018

(30) Foreign Application Priority Data
Nov. 18, 2015   (DK) .................................. 2015 70742

(51) Int. Cl.
*F03D 1/02*   (2006.01)
*F03D 7/02*   (2006.01)
*F03D 7/04*   (2006.01)

(52) U.S. Cl.
CPC ............. *F03D 7/0224* (2013.01); *F03D 1/02* (2013.01); *F03D 7/0268* (2013.01);
(Continued)

(58) Field of Classification Search
CPC ........ F03D 1/02; F03D 7/0224; F03D 7/0268; F03D 7/0296; F03D 7/042;
(Continued)

(56) References Cited

U.S. PATENT DOCUMENTS 5,876,181 A    3/1999   Shin
6,720,670 B2 *  4/2004  Makino ..................... F03D 1/00
                                                              290/55
(Continued)

FOREIGN PATENT DOCUMENTS

CN         104662289 A      5/2015
EP           1456535 A1     9/2004
(Continued)

OTHER PUBLICATIONS

Danish First Technical Examination for Application No. PA 2015 70742 dated Jun. 21, 2016.
(Continued)

*Primary Examiner* — Igor Kershteyn
(74) *Attorney, Agent, or Firm* — Patterson + Sheridan, LLP (57) ABSTRACT

A wind turbine system comprising a plurality of wind turbine modules mounted to a support structure, wherein each of the wind turbine modules comprises a rotor including one or more variable-pitch blades, each defining a respective blade pitch angle and being controlled by a pitch control system, and a control system operable to control the blade pitch angles of the plurality of blades of the wind turbine modules. The control system is configured to identify the presence of a predetermined stop condition and, in dependence thereon, is operable to control the blade pitch angles of the respective blades to predetermined stop positions that reduce oscillation of the support structure. Aspects of the invention also relate to a method of controlling a wind
(Continued)

turbine system, to a controller for implementing the method, and to a computer program product.

18 Claims, 7 Drawing Sheets

(52) U.S. Cl.
CPC ........... *F03D 7/0296* (2013.01); *F03D 7/042* (2013.01); *F05B 2240/221* (2013.01); *F05B 2260/96* (2013.01); *F05B 2270/107* (2013.01); *F05B 2270/111* (2013.01); *F05B 2270/328* (2013.01)

(58) Field of Classification Search
CPC ............ F05B 2240/221; F05B 2260/96; F05B 2270/107; F05B 2270/111; F05B 2270/328
See application file for complete search history.

(56) References Cited

U.S. PATENT DOCUMENTS

| | | | | |
|---|---|---|---|---|
| 6,749,399 | B2 * | 6/2004 | Heronemus | F03D 1/02 416/41 |
| 6,909,198 | B2 * | 6/2005 | Ragwitz | F03D 7/043 290/44 |
| 6,946,751 | B2 * | 9/2005 | Yoshida | F03D 7/0204 290/43 |
| 7,281,891 | B2 * | 10/2007 | Smith | F03D 7/0224 415/4.3 |
| 7,342,323 | B2 * | 3/2008 | Avagliano | F03D 7/0224 290/55 |
| 7,352,075 | B2 * | 4/2008 | Willey | F03D 7/0224 290/44 |
| 7,453,168 | B2 * | 11/2008 | Lanie | F03D 1/04 290/55 |
| 2006/0099075 | A1 * | 5/2006 | Von Mutius | F03D 7/0224 416/131 |
| 2008/0111379 | A1 * | 5/2008 | Altemark | F03D 7/0204 290/44 |
| 2008/0284171 | A1 | 11/2008 | Cory | |
| 2011/0076142 | A1 | 3/2011 | Veldkamp et al. | |
| 2012/0104757 | A1 | 5/2012 | De Las Heras Carbonell et al. | |
| 2013/0209254 | A1 | 8/2013 | Hess et al. | |

FOREIGN PATENT DOCUMENTS

| | | |
|---|---|---|
| EP | 2306005 A2 | 4/2011 |
| FR | 2996881 A1 | 4/2014 |
| GB | 2443886 A | 5/2008 |
| WO | 2010098813 A1 | 9/2010 |
| WO | 2016128005 A1 | 8/2016 |
| WO | 2017084674 A1 | 5/2017 |

OTHER PUBLICATIONS

PCT International Search Report for Application No. PCT/DK2016/050372 dated Nov. 17, 2016.
G. P. Van Den Berg: 11 Wind turbine power and sound in relation to atmospheric stability11 , WI ND Energy, vol. 11, No. 2, Jan. 1, 2008 (Jan. 1, 2008), pp. 151-169, XP055340328, GB ISSN: 1095-4244, DOI: 10.1002/we.240 the whole document.
PCT Written Opinion of the International Searching Authority for Application No. PCT/DKJ2016/050372 dated Nov. 17, 2016.
Chinese Office Action for Application No. 201680067162.4 dated Apr. 3, 2019.

\* cited by examiner

CONTROL SYSTEM AND METHOD FOR WIND TURBINE HAVING MULTIPLE ROTORS

TECHNICAL FIELD

The invention relates to a control system of a wind turbine system having multiple rotors and more particularly, but not exclusively, to an array-type multi-rotor wind turbine system.

BACKGROUND TO THE INVENTION

The most common type of wind turbine is the three-bladed upwind horizontal-axis wind turbine (HAWT), in which the turbine rotor is at the front of the nacelle and facing the wind upstream of its supporting tower. However, several alternative wind turbine designs are also known. One example is the multi-rotor array type wind turbine.

EP1483501B1 discloses a multi-rotor array-type wind turbine in which a plurality of co-planar rotors are mounted to a common support structure. Such a configuration achieves similar economies of scale that can be obtained with a very large single rotor turbine, but avoids the associated drawbacks such as high blade mass, scaled up power electronic components and so on. However, although such a co-planar multi-rotor wind turbine has its advantages, it presents challenges to implement the concept in practice, particularly in how manage plurality of rotors, or nacelles, during high wind speeds.

SUMMARY OF THE INVENTION

According to an aspect of the present invention there is provided a wind turbine system comprising a plurality of wind turbine modules mounted to a support structure, wherein each of the wind turbine modules comprises a rotor including one or more variable-pitch blades, each defining a respective blade pitch angle and being controlled by a pitch control system, and a control system operable to control the blade pitch angles of the plurality of blades of the wind turbine modules. The control system is configured to identify the presence of a predetermined stop condition and, in dependence thereon, is operable to control the blade pitch angles of the respective blades to predetermined stop positions that reduce oscillation of the support structure.

An advantage of the invention is that the pitch angles of the blades are configured in a coordinated manner and optimised to achieve a net reduction in blade excitation during a wind turbine stop event. By setting the stop position of the blades into optimal pitch positions, in effect providing an even spread of blade pitch angles throughout the blades of the wind turbine system, the excitation of the support structure by the blades will be reduced.

In this approach, the blades of the wind turbine system present many different effective surface areas, and also angles of attack, to the oncoming flow of wind, and this remains true for any wind direction. Therefore, in a stop event, the wind direction is a less important consideration and all is required is to set the blades into a predetermined range of stop positions to avoid the support structure being excited unacceptably by the wind conditions. This results in a more reliable wind turbine system that is easier to control in such stop conditions.

In another aspect, the invention resides in a method of controlling a wind turbine system having a plurality of wind turbine modules mounted to a support structure, wherein each of the wind turbine modules comprises a rotor including one or more variable-pitch blades, each defining a respective blade pitch angle, wherein the method comprises: identifying the presence of a predetermined wind turbine stop condition, and, in dependence thereon, controlling the blade pitch angles of the respective blades to predetermined stop positions that are selected to reduce oscillation of the support structure.

The predetermined stop positions may be determined in different ways. In one embodiment the predetermined stop positions of the blades may be selected by way of a randomised selection process. This process may be carried out at any time, but in one embodiment the randomised selection process is carried out when the predetermined stop condition has been identified.

In another embodiment, the predetermined stop positions of the blades are determined by way of an optimisation process during which the pitch position for each blade is determined to reduce the oscillation of the support structure. In one embodiment, the optimised pitch positions may be stored as parameter values in a memory area of the control system so that the pitch control systems may be controlled accordingly. In some embodiments, however, the predetermined stop positions of the respective blades are set mechanically by respective pitch control systems, for example by an end stop position for a respective blade pitch actuator of the pitch control system.

The predetermined stop positions for the blades may be calculated so that each blade has a different position. Alternatively, the predetermined stop positions may be determined to be different for each blade for a given wind turbine module.

The stop position of each blade may be calculated so that it is within a predetermined blade pitch position range. This range may be between 30 and 100 degrees.

In the embodiments, at least some of the plurality of wind turbine modules are mounted to the support structure in pairs, wherein each pair of wind turbine modules are mounted to the support structure by a respective support arm arrangement.

Aspects of the invention may also be expressed as a controller for a wind turbine control system having a plurality of wind turbine modules mounted to a support structure, wherein each of the wind turbine modules comprises a rotor including one or more variable-pitch blades, each defining a respective blade pitch angle, wherein the controller comprises a processor, a memory module, and an input/output system, and wherein the memory includes a set of program code instructions which when executed by the processor, implement a method as described above.

Aspects of the invention may also be expressed as a computer program product downloadable from a communication network and/or stored on a machine readable medium, comprising program code instructions for implementing a method as described above, and also to a machine readable medium having stored thereon such a computer program product.

For the purposes of this disclosure, it is to be understood that the control system described herein can comprise a control unit or computational device having one or more electronic processors. Such a system may comprise a single control unit or electronic controller or alternatively different functions of the controller(s) may be embodied in, or hosted in, different control units or controllers. As used herein, the term "control system" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

So that it may be more fully understood, the invention will now be described by way of example only with reference to the following drawings, in which.

DETAILED DESCRIPTION OF EMBODIMENTS OF THE INVENTION

Figure 1:
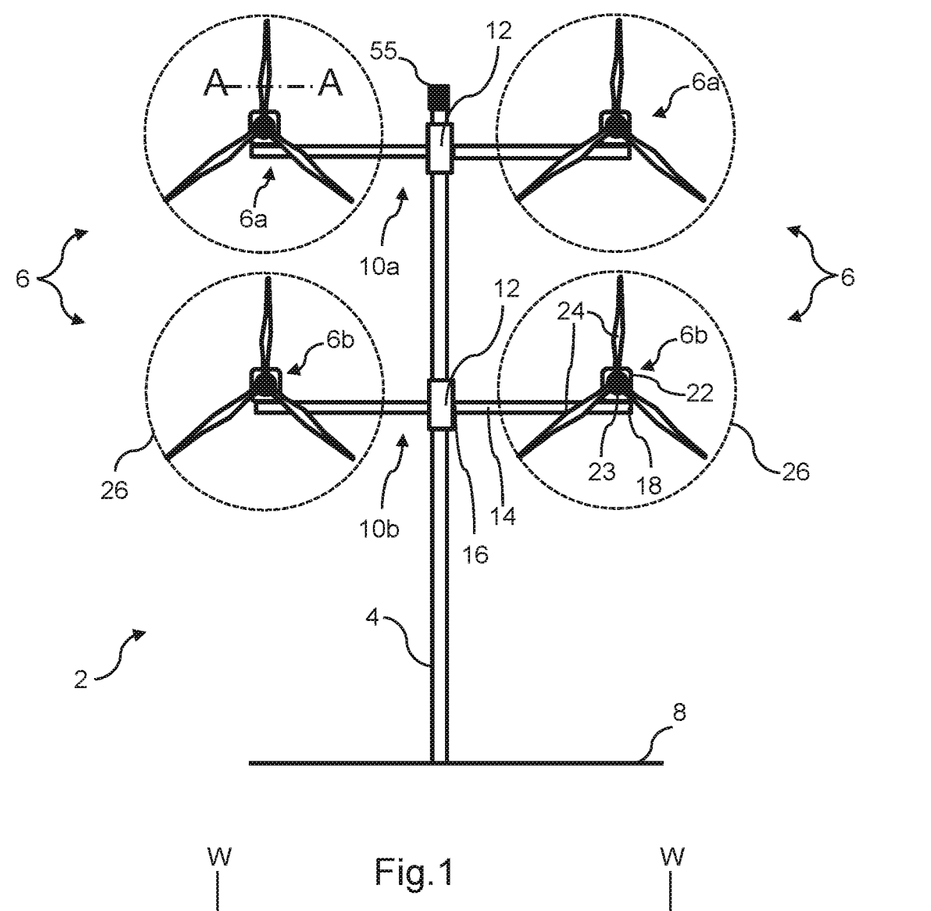
FIG. 1 is a front view of a first embodiment of a multi-rotor wind turbine system.
Figure 2:
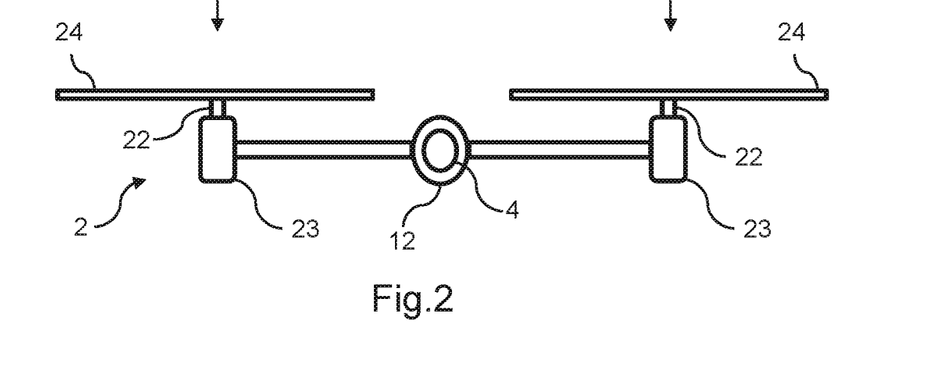
FIG. 2 is a top view of the wind turbine system in FIG. 1.

With reference to FIGS. 1 and 2, a wind turbine installation or 'system' 2 includes a support structure in the form of a tower 4 on which is mounted a plurality of wind turbine modules 6. The entire wind turbine system 2 is supported on a foundation 8, as is usual, which may be a large mass buried in the ground, although other foundation structures are known. Note that the term 'wind turbine module' is used here to refer mainly to the generating components of the wind turbine system and as being separate to the tower 4.

In this embodiment, there are four wind turbines modules 6, and these are mounted to the tower 4 in two pairs, each pair including two wind turbines 6 that are mounted to the tower 4 by a respective support arm arrangement 10. So, a first pair of the wind turbines, labelled as 6a, are associated with a first support arm arrangement 10a, and a second pair of the wind turbines, labelled as 6b, are associated with a second support arm arrangement 10b. Other configurations are possible, however, in which the wind turbine modules 6 are not mounted in pairs but, instead, are mounted to the support structure 4 singly or in groups of three or more, or where the support arm structures are mounted at a different angle with respect to the tower.

Since each pair of wind turbines and their associated support arm arrangements are essentially identical, they will be referred to below generally by reference numerals without suffixes. This also applies to components of the support arm arrangements. However, reference to a specific one of the support arm arrangement, associated wind turbines, or sub-components, will be made using the suffixes 'a' or 'b' to refer to the upper or lower support arm arrangement, as appropriate.

Each support arm arrangement 10 comprises a mount portion or coupling 12 and first and second support arms 14 that are mutually opposed and extend laterally from the mount portion 12. As such, each of the support arms 14 includes an inner end 16 connected to the mount portion 12 and an outer end 18 that is connected to a respective wind turbine module 6. The support arm arrangement 10 is mounted to the tower 4 at the mount portion 12 so that it is able to yaw about the vertical axis of the tower 4. A suitable yaw system (not shown) may be provided for this purpose, and such yaw systems are known generally in the art. The mount portion 12 therefore represents a yaw unit of the support arm arrangement 10 which is able to 'yaw', i.e. move angularly, the support arm arrangement 10 about the major axis of the tower 4. Note that in FIG. 2, only the upper one of the support arm arrangements can be seen, since the lower one is hidden. Further note that the yaw units will be referred to using the same reference numerals as for the mount portions 12. Other embodiments are envisaged in which the support arm arrangements 10 are able to yaw about the tower driven by the differential thrust developed by each of the wind turbine modules, but further explanation is not provided here for the sake of clarity.

Each of the wind turbine modules 6 includes a rotor 22 that is rotatably mounted to a nacelle 23 in the usual way. The rotor 22 has a set of three blades 24 in this embodiment. Three-bladed rotors are a common rotor configuration, but different numbers of blades are also known. Thus, the wind turbines modules 6 are able to generate power from the flow of wind that passes through the swept area or 'rotor disc' 26. Although the wind turbine modules 6 can be considered to be substantially identical, in general wind turbine modules with different specifications may be used, such as different rotor diameter and different generating systems, for example.

During operation, the forces generated by the wind turbine modules 6 excite the tower 4 and cause it to oscillate in different modes; for example the tower 4 will sway back and forth, and also side to side, thereby giving rise to first and second modes of oscillation. The tower 4 may also experience torsional excitation, due to wind action but also due to any thrust imbalances between individual ones of the wind turbine modules 6, which gives rise to another mode of oscillation. The oscillation of the support structure leads to fatigue which may impact the service life of the installation as a whole. Although the tower and support arm arrangements are designed to withstand a certain amount of structural stress, high wind speeds can cause excessive stress to be placed on the structure during operation. A related problem is that even moderate wind conditions will cause the structure to oscillate when the wind turbine system has been brought to an idle or stop state, for example during a shutdown event. The embodiments of the invention provide a strategy for managing the stress induced on the wind turbine system during such shutdown events.

FIGS. 1 and 2 show the main structural components of the wind turbine system 2, although the skilled person would understand that the illustrated embodiment has been simplified in order not to obscure the invention with unnecessary detail. Further explanation will now be provided on the system components of the wind turbine system 2 with reference also to FIG. 3.

Figure 3:
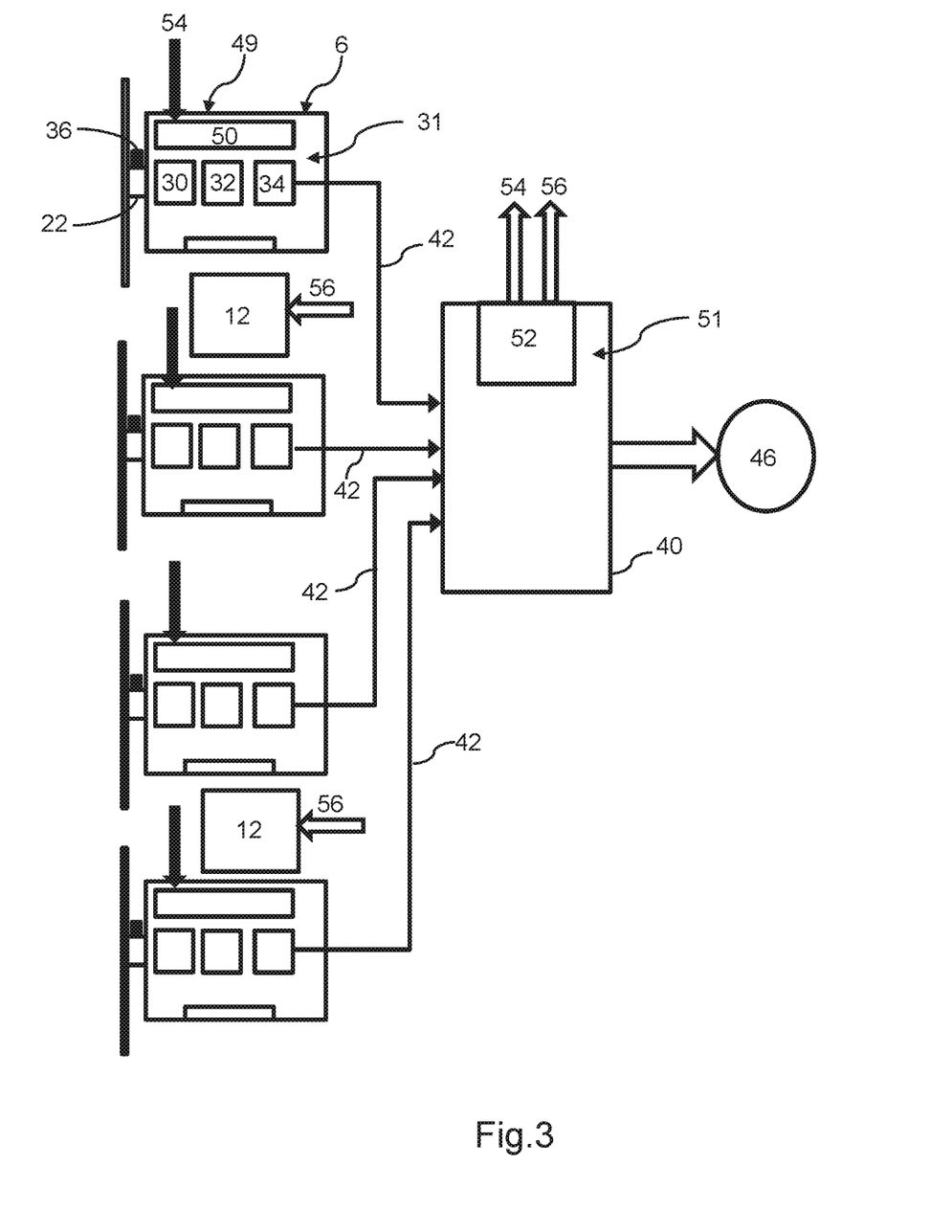
FIG. 3 is a schematic systems view of the wind turbine system in FIG. 1.

On a systems level, each wind turbine module 6 includes a gearbox 30 and a power generation system 31 including a generator 32 and a converter system 34. As is known, the gearbox 30 gears up the rotational speed of the rotor and drives the generator 32 which, in turn, feeds generated power to a converter system 34. Such architecture is known, and others are possible, such as 'gearless' types, also known as 'direct drive', as well as 'belt drive' transmission types.

In order that the speed of the rotors 22 can be controlled, thereby allowing control over the power produced by the wind turbine modules 6, the blades have variable pitch. A pitch control system 36 is thus provided to control the pitch of the blades relative to their longitudinal axes, which includes respective pitch control actuators for this purpose, as would be well understood by a skilled person. The precise configuration of the generator 32 and converter system 34 is not central to the invention and will not be described in detail. However, for present purposes these components can be considered to be conventional and, in one embodiment, may be based on a full scale converter (FSC) architecture or a doubly fed induction generator (DFIG) architecture, although other architectures would be known to the skilled person. Furthermore, each of the wind turbine modules can be considered to be substantially identical, so only one has been labelled fully in FIG. 3 for clarity.

In the illustrated embodiment, the power output of the converter 34 of each wind turbine 6 is fed to a distribution unit 40 which has a function to receive power inputs 42 from the wind turbines 6 over suitable cabling for onward transmission to a load 46, which is shown here as the electrical grid. Although not shown here, it should be appreciated that the central control and distribution unit 40 may be located in any suitable position, for example within the tower 4. The skilled person would be aware that different power conversion and transmission options exist, and it would be within the abilities of the skilled person to specify a suitable system. Thus, this aspect is not described in more detail here.

It should be noted at this point that only a single wind turbine system 2 is described here, but that several such systems may be grouped together to form a wind power plant, also referred to as a wind farm or 'wind park'. In this case, a power plant control and distribution facility (not shown) would be provided to coordinate and distribute the power outputs from the individual wind turbine systems to the wider grid.

Since the wind turbine system 2 includes a plurality of wind turbine modules 6, each of which is operable to generate electrical power as the rotor 22 is driven by the wind, the wind turbine system 2 includes localised control means 49 that is operable to monitor the operation of respective ones of the plurality of wind turbines 6 and to issue commands thereto to achieve a set of local control objectives. In this embodiment, the localised control means 49 is provided in the form of a plurality of local control modules 50 that are embodied as respective computing devices each of which is dedicated to an associated wind turbine module 6. One such control objective is to monitor rotor speed and power output and to control the pitch control system 36 and the generator 32 in order to ensure that maximum power is extracted from the wind during below-rated operating conditions and that the rotational speed is controlled above-rated operating conditions.

Although each of the wind turbine modules 6 includes a local control module 50, the wind turbine system 2 also includes a centralised control means 51 which serves a supervisory function in order to provide a coordinated control strategy. In this embodiment, the centralised control means 51 is provided by a central control module 52 being a computing device incorporated in the central distribution unit 40 but, in general, it may also be placed separate from the distribution unit 40. Here, the central control module 52 is located on the tower 4, e.g. in the tower or in a housing adjacent the tower, although it is envisaged that other locations would be acceptable. As will be explained, the central control module 52 is configured to monitor the operation of the wind power system 2, that is to say the wind turbines modules 6 and the tower 4, and to provide centralised control commands to the plurality of wind turbine modules 6 in order to achieve a supervisory control objective.

The central control module 52 achieves control over each of the wind turbine modules 6 by providing control commands to them. As shown in FIG. 3, the central control module 52 outputs first control commands 54 which are received by each one of the wind turbine modules 6 and, more particularly, are received by the local control modules 50. The control commands 54 may be of the 'broadcast' type of command in which the same command is sent out to each wind turbine modules 6, or the commands may be of the 'directed' type of command in which a specific control command is set to a selected one or more, but not all, of the wind turbine modules 6.

It will be noted that FIG. 3 is a schematic view, so the way in which the control commands 54, 56 are transferred to the wind turbines 6 is not depicted explicitly. However, it will be appreciated that suitable cabling may be provided to interconnect the central control unit 52 to the wind turbine modules 6, and more specifically to the local control modules 50. The interconnections may be direct or 'point to point' connections, or may be part of a local area network (LAN) operated under a suitable protocol (CAN-bus or Ethernet for example). Also, it should be appreciated that rather than using cabling, the control commands 54,56 may be transmitted wirelessly over a suitable wireless network, for example operating under WiFi™ or ZigBee™ standards (IEEE802.11 and 802.15.4 respectively).

The objective of the central control module 52 is to implement a coordinated control strategy for the group of wind turbine modules 6 so that their interactions between each other, and the interactions between the wind turbine modules 6 and the support structure 4 are managed in the most effective way. Expressed another way, the central control module 52 applies a higher level control strategy to the operation of the wind turbine installation 2, whereas the local control modules 50 apply a lower level control strategy to each respective wind turbine modules 6 individually. However, both 'levels' of the control strategy operate together in order to optimise the performance of the wind power system 2, both in terms of absolute power production, production efficiency, and fatigue optimisation.

In the embodiments of the invention, the central control module 52 is configured to take action during potentially dangerously high wind conditions, or during other relevant 'stop' or 'shutdown' conditions, to set the wind turbine modules, and more specifically the pitch angles of the blades of those modules 6, into a 'safe' or 'stop' state which reduces the stress caused on the wind turbine modules themselves and on the support arm arrangements 10 and the tower 4. This action may be referred to as a stop event from now on.

Figure 4:
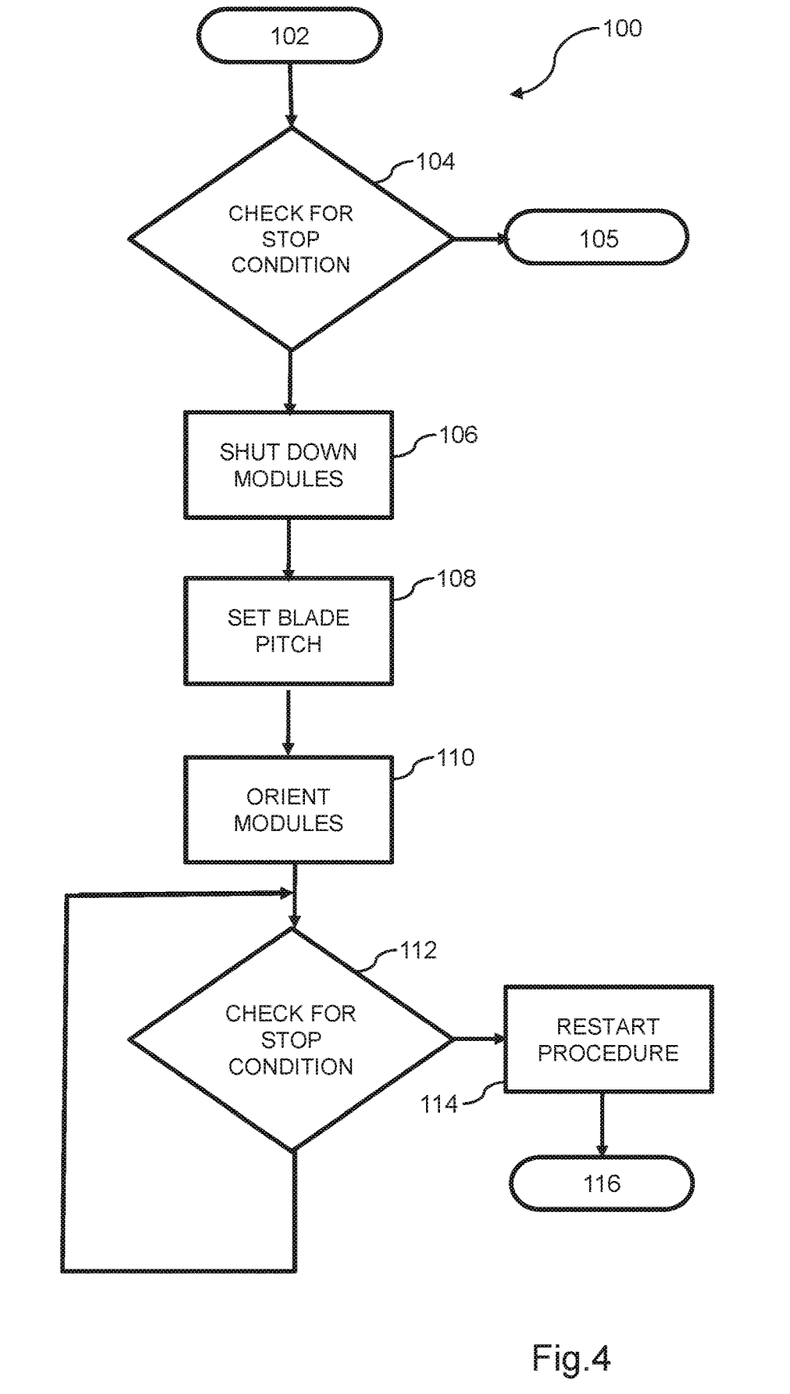
FIG. 4 is a flow chart illustrates a process governing the configuration of the wind turbine system of FIG. 1 into a safe or 'stop' state.

FIG. 4 is a flowchart of an embodiment of a process 100 that governs the configuration of the wind turbine system 2 into the stop state during a stop event. In this embodiment, the process 100 is implemented by the central control module 52 so that the blades are controlled by the pitch control system 36 in a coordinated manner rather than by a module-by-module manner. However, it should be appreciated that the process 100 could be implemented elsewhere, for example in a control system that forms part of a wind farm comprising many such multi-rotor wind turbine systems 2, or in one of the local control modules 50 acting as a 'master' device.

The process 100 initiates at step 102 which may be when the wind turbine system 2 has been started and before the wind turbine modules 6 have reached a power generating state. Therefore, the process 100 may provide a level of safety to verify that the stop conditions are not present before running the wind turbine system up to an operational speed.

At step 104, the process 100 performs a check on the stop conditions. The stop conditions may be any condition that would affect the operation of the wind turbine system and require it to trigger a stop event, thereby to stop operating. For example, grid failure may mean that a power supply isn't available to provide power to the electrical consumers of the wind turbine system 2, for example the pitch control system. However, a backup power supply may be able to provide temporary power for a short time period to those electrical consumers. Also, the wind turbine system 2 may detect that there is a fault with the power conversion system 31 which requires the system to be shutdown. Alternatively, the wind conditions may be such that it is not safe to continue operation of the wind turbine. In this case, wind conditions may be obtained by a wind sensor 55 mounted on the tower 4 for example. Alternatively, information about local wind conditions could be provided to the wind turbine system. Such a wind sensor is conventional and would be known to the skilled person as typically including a wind speed and direction sensor e.g. an ultrasonic device, or an anemometer and wind vane, although different devices are also known in the art, for example based on LIDAR sensors.

When monitoring wind conditions, it is important to identify when the wind conditions are considered to compromise the safe operation of the wind turbine. As such the stop condition check step 104 may be configured to monitor various parameters such as instantaneous wind speed and direction, average wind speed and direction, peak gust speed and so on, and to compare these parameters against suitable thresholds in order to arrive at a decision as to whether the prevailing wind conditions are safe or unsafe. The system could also be configured to monitor for predicted unsafe conditions, for example from advanced bad weather warnings from metrological services, from warnings from other turbines or wind farms, or from seismic sensing systems near to the wind turbine systems that incorporate weather sensing facilities, for example.

If the stop conditions are determined to be safe, then the process 100 terminates at step 105 so that the operation of the wind turbine system 2 is unaffected.

However, if the shutdown conditions are determined to be present the process 100 proceeds to step 106 at which the central control module 52 commands all of the wind turbines 6 to initiate a stop event in which power generation is terminated and the rotors are brought to either to a stop or to an idle condition. It is envisaged that an idle condition may be preferable since this would not require the application of a mechanical brake, which may apply high gear loads.

Once the stop event has been initiated at step 106, the central control module 52 commands the pitch control systems 36 of the wind turbine modules 6 to set the pitch of the blades into a non-power-producing position at step 108. This is described in more detail below in reference to FIGS. 5 and 6.

Optionally, once the wind turbine modules 6 have been shut down and the pitch of the blades have been regulated so that the rotors are no longer producing power, the central control module 52 may command the yaw units 12a, 12b of the support arm arrangements 10a, 10b to a predetermined stop state at step 110. The stop state may require that the rotors 22 all face 'into the wind' such that the rotational axes of the rotors 22 are parallel to the prevailing wind direction. In this situation, therefore, all of the support arm arrangements 10 would be controlled so as to extend in a direction that is perpendicular to the prevailing wind direction. Alternatively, the support arm arrangements 10 may be controlled into different angular positions.

Although the orientation step 110 is shown as following the blade pitching step 108 in FIG. 4, it should be noted that the ordering is not essential.

Once the wind turbine modules 6 have been oriented into the stop state at step 110, a second stop condition check is performed at step 112, as was performed at step 102. Here the central control module 52 checks to see if the stop conditions are still considered to be present, or whether the stop conditions have been resolved such that it is safe to re-start the wind turbine system for power production. This check is repeated for as long as the stop conditions are determined to be present. However, once the stop conditions are determined as being not present, the central control module 52 implements a wind turbine restart procedure at step 114 at which the support arm arrangements 10 and the blades are commanded back to their start position in which the wind turbines face into the prevailing wind direction. The process 100 then terminates at step 116.

The process by which the blades 24 of the rotors 22 are configured into corresponding stop positions to reduce vibration of the support structure will now be described in more detail.

Figure 5:
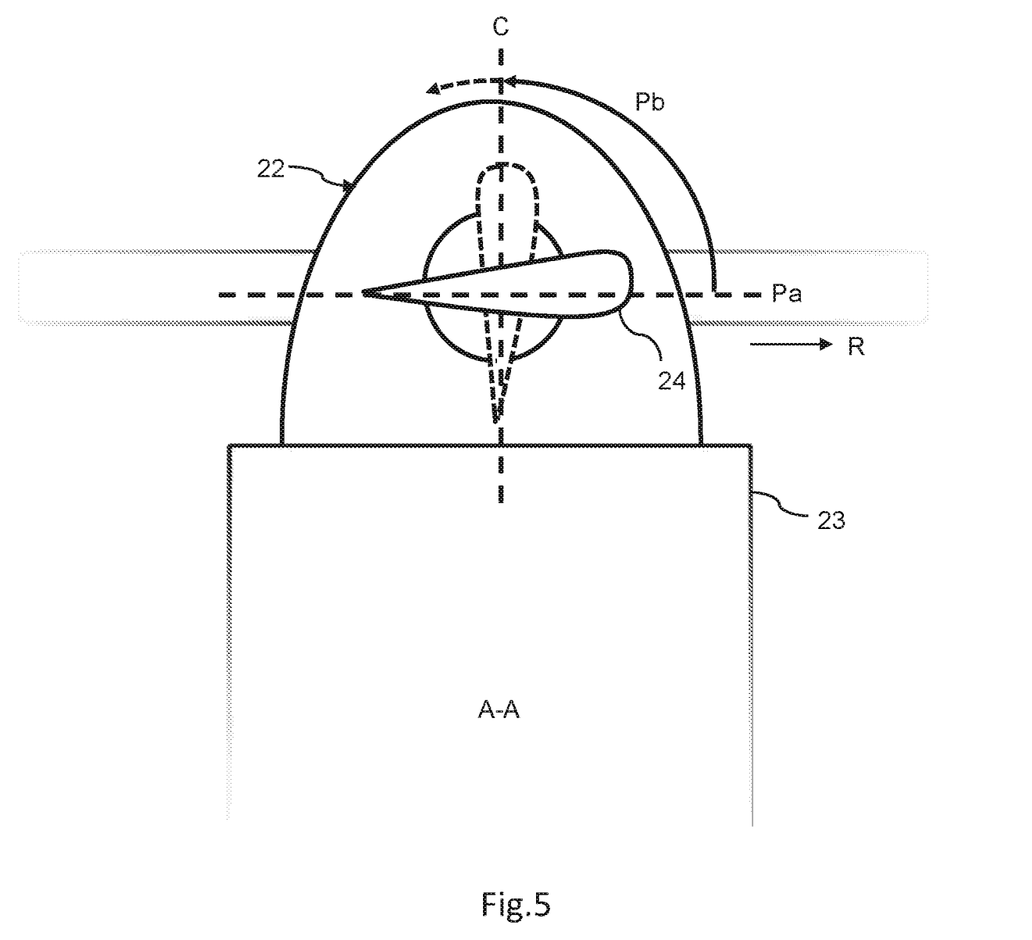
FIG. 5 is a view of a rotor of the wind turbine system in FIG. 1, taken through a blade section A-A in FIG. 1, which provides an explanation of blade pitch angle.

FIG. 5 shows a blade 24 along a chord-wise section taken along line A-A in FIG. 1, and demonstrates the variable pitch of the blade 24 relative to the rotor 22 and nacelle 23. As would be appreciated by the skilled person, wind turbine blades are typically configured so that their pitch may be changed during operation in order to increase or decrease the thrust generated by the blade 24 on the rotor 22. Typically, blade pitch can be varied from a zero pitch position Pa in which the chord-wise axis C of the blade 24 is substantially coincident with the plane of rotation (identified by the arrow 'IR') of the rotor disc 26, as shown in FIG. 5, and up to a predetermined positive pitch angle Pb which may be equal to or greater than 90 degrees. The pitch angle settings are used to vary the thrust produced by the blade on the rotor.

A pitch angle of 90 degrees, where the chord-wise axis C of the blade 24 is substantially perpendicular to the plane of rotation R of the blade, is usually considered to be a 'park' or 'feathered' position of the blade 24 since at this angle the blade 24 should not produce thrust on the rotor 22 provided that the nacelle 23 is directed into the wind.

When a blade is in the feathered position, it should not produce significant thrust on its associated rotor while the wind direction is substantially perpendicular to the plane of rotation of the blade. However, a substantial change in wind direction may result in vortex-shedding from all feathered blades which may induce unwanted vibrations and oscillations of the support structure. Whilst it is accepted convention that blades should be 'parked' in a feathered position when a wind turbine is non-operational, this may have an undesirable effect in the context of a multi-rotor wind turbine system in which the high number of blades may increase the excitation of the support structure.

The invention proposes a technique to mitigate the effects of blade excitation during a wind turbine stop event by setting the pitch angles of the blades of all of the rotors to pre-determined pitch angle positions when the wind turbine system enters a stop event. By setting the stop position of the blades into optimal pitch positions, in effect providing an even spread of blade pitch angles throughout the blades 24 of the wind turbine system 2, the excitation of the support structure 4 by the blades will be reduced. In this approach, the blades 24 of the wind turbine system 2 present many different effective surface areas, and also angles of attack, to the oncoming flow of wind, and this remains true for any wind direction. Therefore, in a stop event, the wind direction is a less important consideration and all is required is to set the blades into a predetermined range of stop positions to avoid the support structure being excited unacceptably by the wind conditions.

The exact pitch angle position of the blades 24 is not crucial. However, what is important is that the pitch angles of the blades are selected to achieve a significant net reduction of the excitation on the support structure. The differing blade pitch angles for each blade result in a minimisation of stresses on the blades and support arm arrangements during a stop event regardless of wind direction.

The precise pitch angles of the blades across all of the rotors may be determined in several ways. One option is to select an even spread of pitch angles for all of the blades across a predetermined angle range. For example, in the embodiment of FIG. 6 in which there are twelve blades in total, three for each rotor 22, the blade pitch angles have a spread from 35 degrees to 105 degrees (i.e. a spread of 100 degrees in total) in 5 or 10 degree increments.

Figure 6:
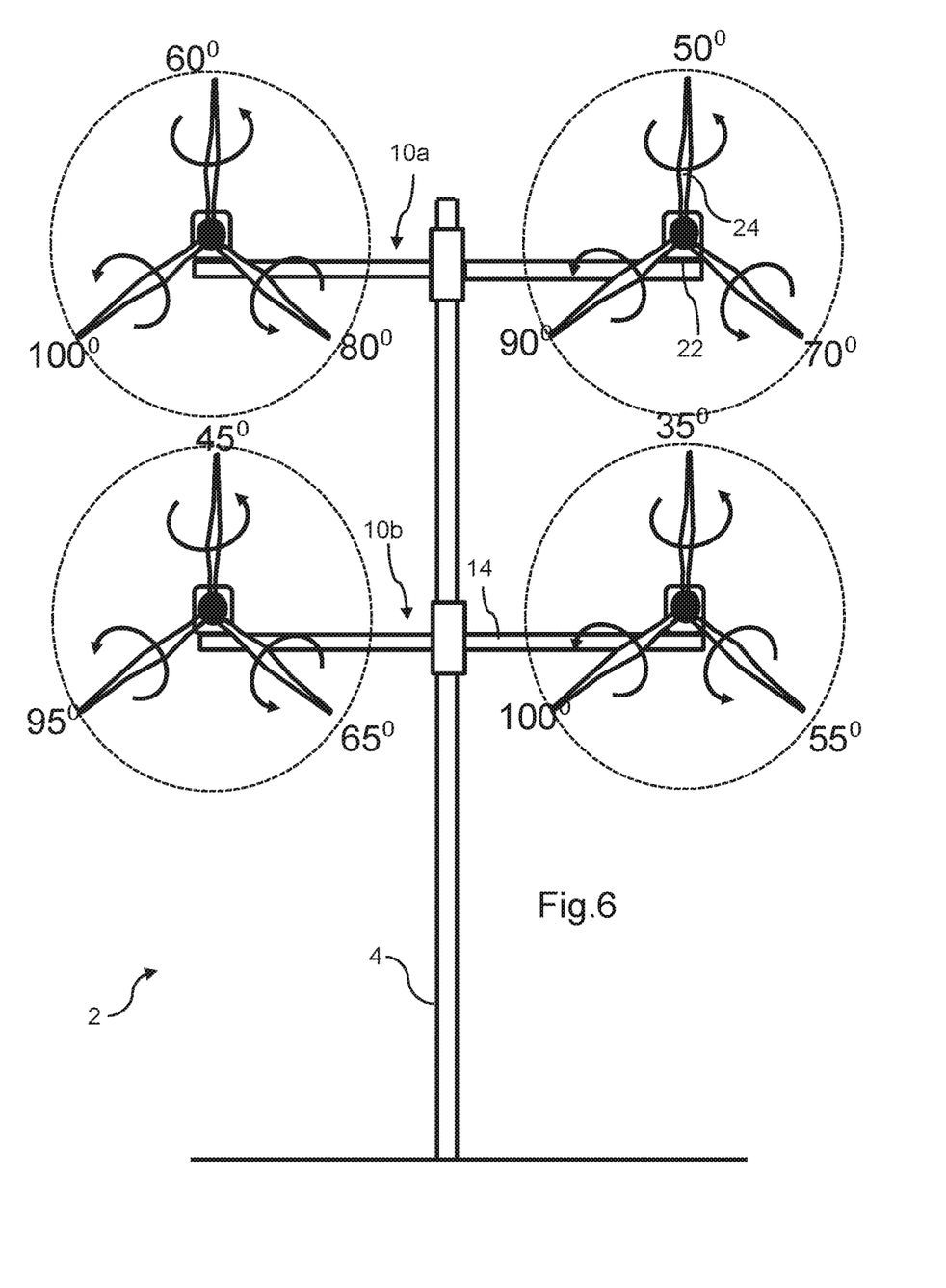
FIG. 6 is a front view of the wind turbine system in FIG. 1 in a stop state, according to one embodiment.

More specifically, in this embodiment, the blades of one of the wind turbine modules 6 (top left position) may be angled at 60, 80, and 100 degrees, the blades of another one of the wind turbine modules 6 (top right position) may be angled at 50, 70 and 90 degrees, the blades of another one of the wind turbine modules 6 (bottom left position) may be angled at 45, 65 and 95 degrees, whilst the blade of a final one of the wind turbine modules 6 (bottom right position) may be angled at 35, 55 and 105 degrees. It should be understood that these angle values are given by way of example and should not be considered as limiting the scope of the inventive concept. The precise pitch position settings for the blades may be selected at random, for example by a routine that is executed by the central control module 52. Alternatively each of the local control modules 50 may execute a routine to generate pitch settings for the respective blades.

Other embodiments are envisaged in which the angle of spread is greater, for example a spread of 180 degrees, 270 degrees or 360 degrees. A greater angle of spread would be particularly appropriate for wind turbine systems having a greater number of wind turbine modules and, therefore, a greater number of blades.

Figure 7:
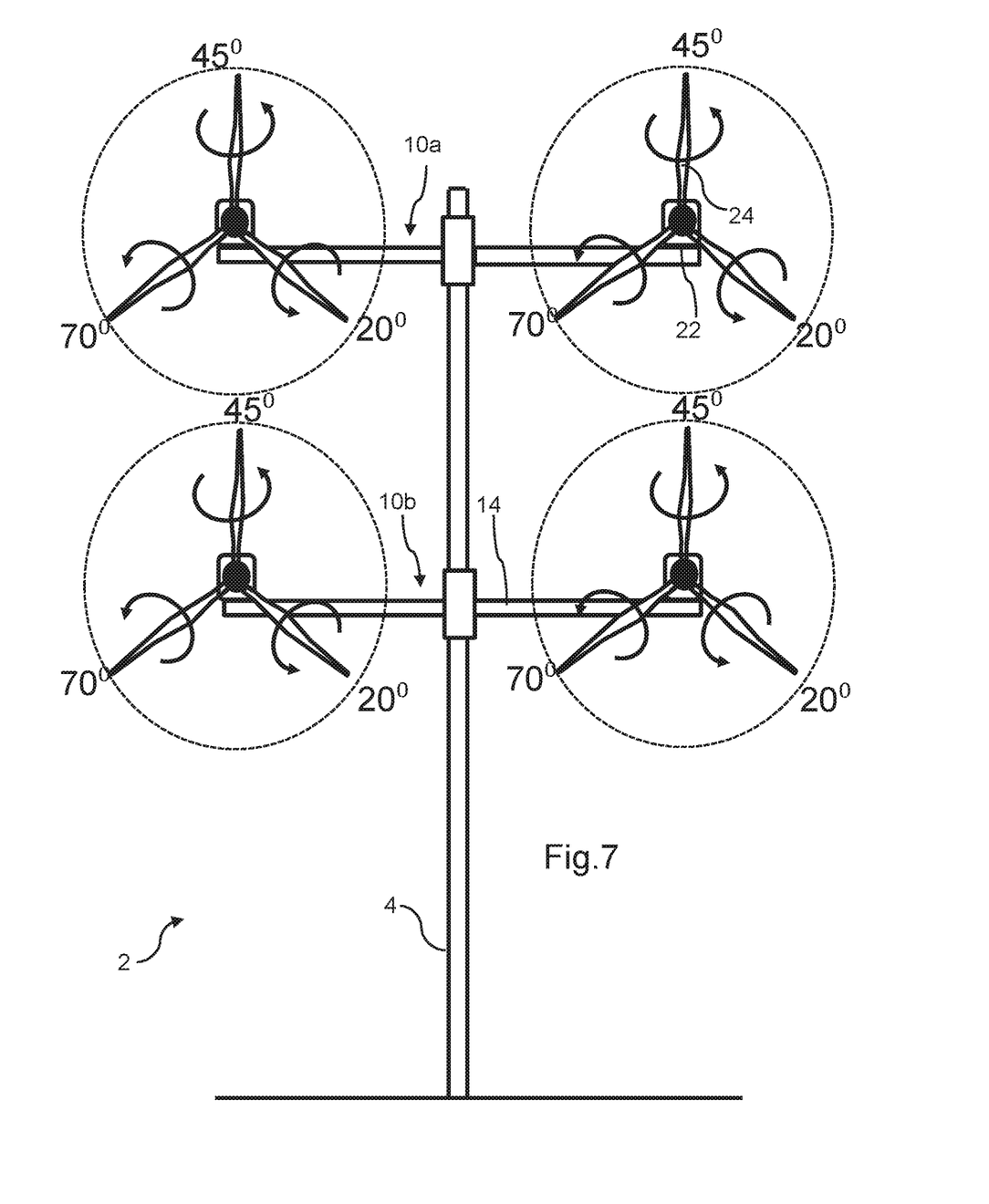
FIG. 7 is a front view of the wind turbine system in a stop state according to an alternative embodiment.

In another embodiment, as shown in FIG. 7, the predetermined stop positions for respective blades on each rotor are substantially the same for each wind turbine module 6. For example, it can be seen from FIG. 7 that the blades 24 of each rotor are angled at 20, 45 and 70 degrees respectively. The azimuth position for each rotor may also be set to a predetermined angular position that is different for each rotor.

With the above pitch angles in mind, it will of course be appreciated that some angular misalignment between the blades is to be expected, and tolerated.

Other embodiments are envisaged in which the blade stop positions are mirrored about the tower 4. So, the blade pitch position for the blades on the right hand side of the tower could be selected to be the same as the blade pitch positions for the blades on the left hand side of the tower. In other embodiments, it may be possible to tune the angular difference so as to optimise the damping effect of the dissimilar positions of the blades.

One option is for the value of the blade pitch angles for the blades to be determined by way of a probabilistic design process run in an offline execution environment to determine the appropriate blade pitch angles to apply to the blades in order to minimise the excitation of the support structure 4. For example, a number of simulations could be conducted under different wind conditions (involving metrics for wind speed, wind direction, turbulence, wake, wind shear and so on) to determine the blade pitch angles for each blade of the wind turbine system that results in a useful reduction in structural excitation. Therefore, this approach coordinates the pitch angles of all of the blades over the entire multi-rotor wind turbine system 2 in order to reduce the excitation of the support structure when in a stop state. Within this approach, the wind profile of the site at which the wind turbine system 2 is located could be taken into account in order to derive a set of blade pitch angles that are selected to reduce the induced oscillation of the support structure. In this example, the optimised pitch positions for each blade and, if appropriate, the rotor azimuth positions, may be stored as parameter values in a suitable memory area within the central control module 52 for all of the blades. Alternatively, the local control modules 50 for each wind turbine module 6 may be responsible for storing and implementing the pre-determined blade pitch positions for its respective blades, and also the rotor azimuth position.

The stop position of the blades may be configured in different ways. In one embodiment, the pitch control system 36 for each blade sets the predetermined stop position mechanically, in that it may drive the respective blade to its predetermined stop position and holds it in that position until such time that it receives a command to change the blade pitch angle away from the stop position.

In other embodiments, the blade pitch system 36 for each blade includes a respective blade pitch actuator (not shown) in which an end stop is set at the stop position for the respective blade. In a stop event, or in a situation where power to the pitch control system 36 fails, each blade can be considered to pitch automatically to a determined 'lock' angle. At this point, the blade is unable to rotate any further and is fixed in place until the central control module commands the blade pitch angles to return to their operational state. Beneficially, in this embodiment the actuator does not require power to move the blade to its stop position, and avoids the need for a backup power unit for the pitch control system.

The skilled person will appreciate that modifications may be made to the specific embodiments described above without departing from the inventive concept as defined by the claims.

Reference has been made above to wind turbine system 2 with different numbers of wind turbine modules 6. Two alternatives are shown in FIGS. 8 and 9 by way of example, in which the wind turbine system 2 in FIG. 8 comprises six wind turbine modules 6 grouped into three pairs, each pair associated with a different one of three support arm arrangements 10, whereas the wind turbine system 2 in FIG. 9 include a single pair of wind turbine modules 6 mounted on a respective support arm arrangement 10.

Figure 8:
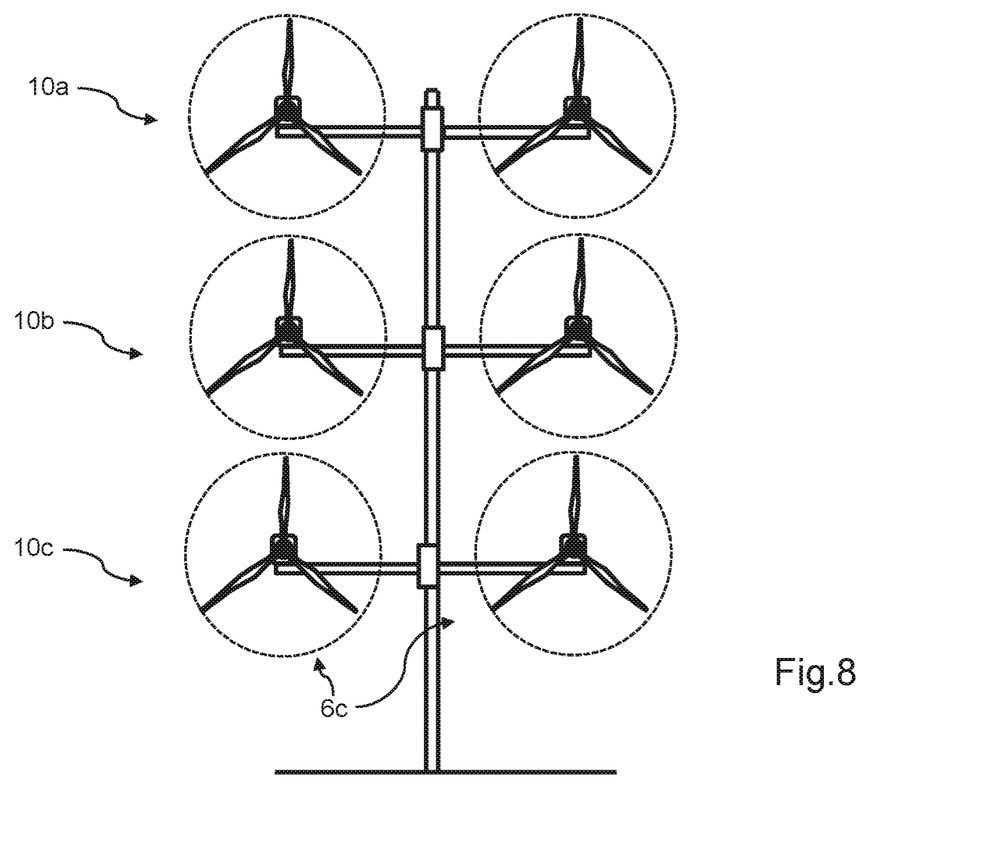
FIGS. 8 and 9 are front views of alternative wind turbine systems.
Figure 9:
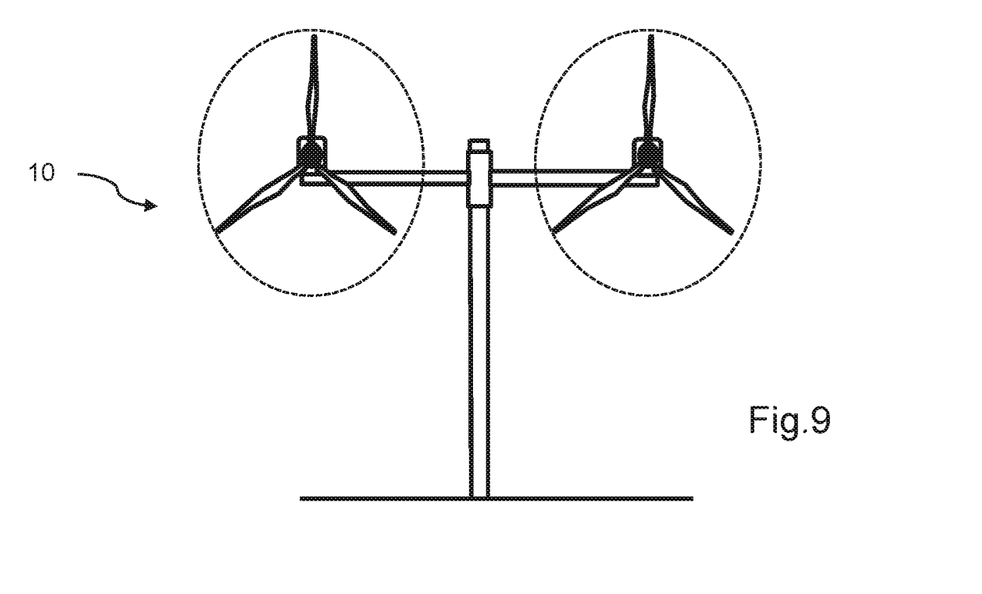

It should be noted that in the wind turbine systems 2 of FIGS. 8 and 9 the wind turbine modules 6 are grouped into pairs and, moreover, arranged in the same plane. However, this need not be the case. It is envisaged in other embodiments that wind turbine systems could be configured such that wind turbine modules may alternatively, or additionally, be located between the pairs of wind turbine modules on the ends of the support arms. Also, the wind turbine modules need not be arranged to be in the same plane.

The invention claimed is:

1. A wind turbine system comprising:
a plurality of wind turbine modules mounted to a support structure, wherein each of the wind turbine modules comprises a rotor including one or more variable-pitch blades, each defining a respective blade pitch angle and being controlled by a pitch control system,
a control system operable to control the blade pitch angles of the plurality of blades of the wind turbine modules, wherein the control system is configured to identify the presence of a predetermined stop condition and, in dependence thereon, is operable to control the blade pitch angles of the respective blades to predetermined stop positions that reduce oscillation of the support structure.

2. The wind turbine system of claim 1, wherein the predetermined stop positions of the blades are selected by way of a randomised selection process.

3. The wind turbine system of claim 2, wherein the randomised selection process is carried out when the predetermined stop condition has been identified.

4. The wind turbine system of claim 1, wherein the predetermined stop positions of the blades are determined by way of an optimisation process during which the pitch position for each blade is determined to reduce the oscillation of the support structure.

5. The wind turbine system of claim 4, wherein the predetermined stop positions of the blades are stored as parameter values in a memory area of the control system.

6. The wind turbine system of claim 4, wherein the predetermined stop positions of the respective blades are set mechanically by respective pitch control systems.

7. The wind turbine system of claim 6, wherein the predetermined stop positions of the respective blades are set by an end stop position for a respective blade pitch actuator.

8. The wind turbine system of claim 1, wherein the predetermined stop position of each blade is different.

9. The wind turbine system of claim 1 wherein the predetermined stop position of each blade for an associated wind turbine module is different.

10. The wind turbine system of claim 1, wherein the predetermined stop position of each blade is within a predetermined blade pitch position range.

11. The wind turbine system of claim 10, wherein the predetermined blade pitch position range is between 30 and 100 degrees.

12. A method of controlling a wind turbine system having a plurality of wind turbine modules mounted to a support structure, wherein each of the wind turbine modules comprises a rotor including one or more variable-pitch blades, each defining a respective blade pitch angle, wherein the method comprises: identifying the presence of a predetermined wind turbine stop condition, and, in dependence thereon, controlling the blade pitch angles of the respective blades to predetermined stop positions that are selected to reduce oscillation of the support structure.

13. The method of claim 12, wherein the predetermined stop positions of the blades are selected by way of a randomised selection process.

14. The method of claim 13, wherein the randomised selection process is carried out when the predetermined stop condition has been identified.

15. The method of claim 12, wherein the predetermined stop positions of the blades are determined by way of an optimisation process during which the pitch position for each blade is determined to reduce the oscillation of the support structure.

16. The method of claim 15, wherein the predetermined stop positions of the blades are stored as parameter values in a memory area of the control system.

17. A controller for a wind turbine control system having a plurality of wind turbine modules mounted to a support structure, wherein each of the wind turbine modules comprises a rotor including one or more variable-pitch blades, each defining a respective blade pitch angle, wherein the controller comprises a processor, a memory module, and an input/output system, and wherein the memory includes a set of program code instructions which when executed by the processor, implement an operation comprising:
determining the presence of a predetermined wind turbine stop condition; and
responsive to determining the presence of the predetermined wind turbine stop condition, controlling the blade pitch angles of the respective blades to predetermined stop positions that are selected to reduce oscillation of the support structure.

18. A computer program product downloadable from a communication network and/or stored on a machine readable medium, comprising program code instructions which when executed by a processor, implement an operation comprising:
determining the presence of a predetermined wind turbine stop condition; and
responsive to determining the presence of the predetermined wind turbine stop condition, controlling the blade pitch angles of the respective blades to predetermined stop positions that are selected to reduce oscillation of the support structure.

* * * * *